April 16, 1968 L. DEKKER ET AL 3,378,052
WEIGHT CONTROLLED SLICING MACHINE
Filed Nov. 5, 1965 7 Sheets-Sheet 1

INVENTOR.
LAUNCELOT DEKKER
LEROY J. RYAN JR.

Mayall, Johnston, Cook & Root
ATTORNEYS

April 16, 1968     L. DEKKER ET AL     3,378,052
WEIGHT CONTROLLED SLICING MACHINE
Filed Nov. 5, 1965     7 Sheets-Sheet 2
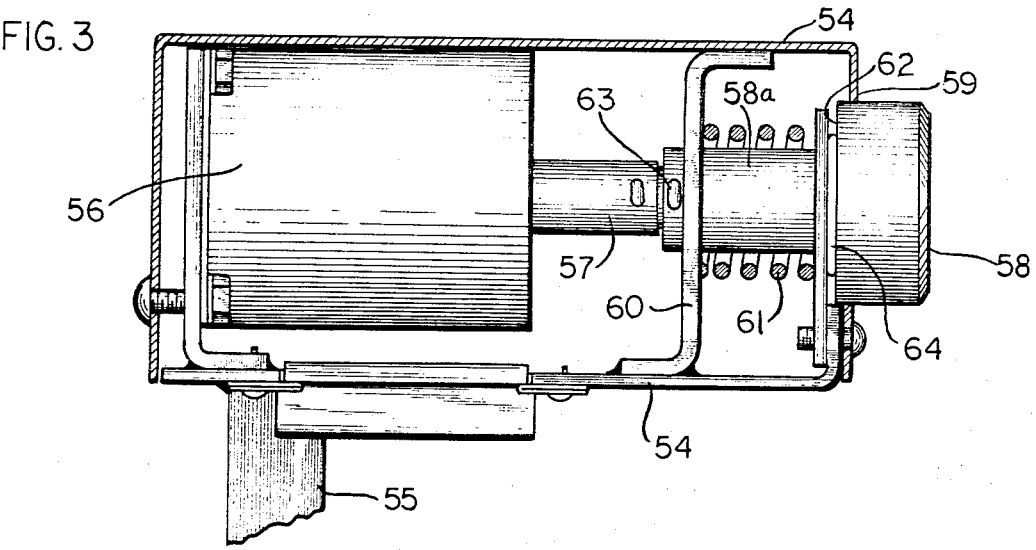
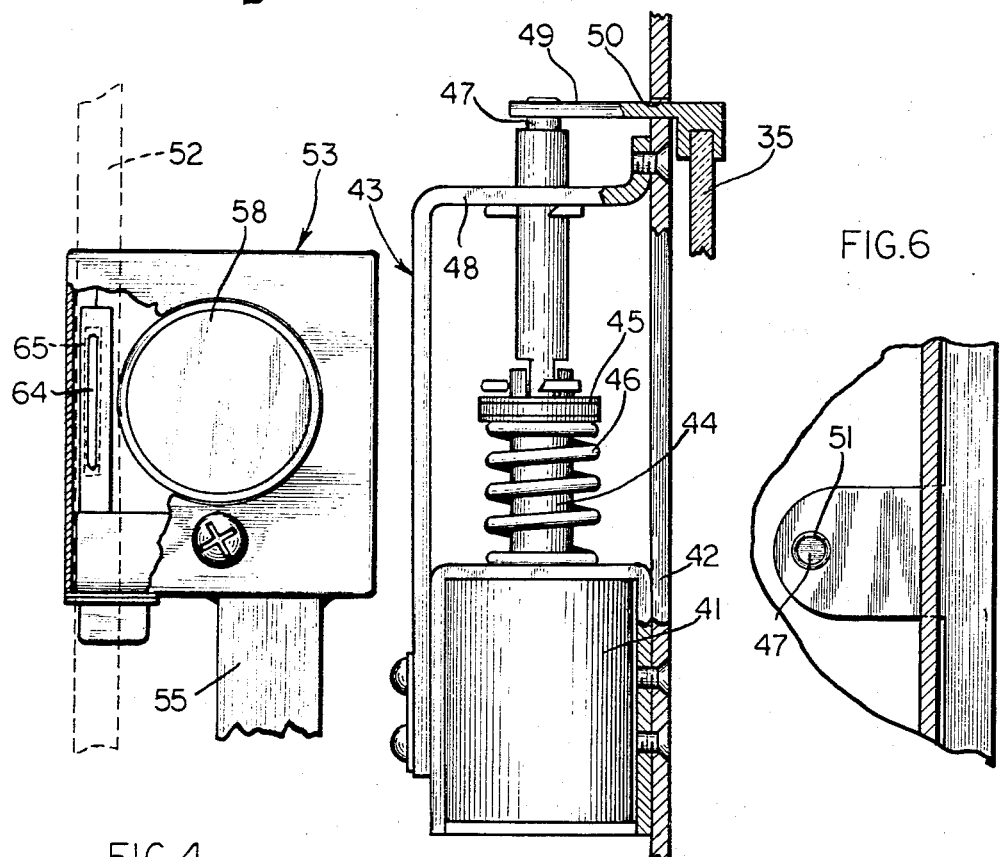
INVENTOR.
LAUNCELOT DEKKER
LEROY J. RYAN JR.
ATTORNEYS

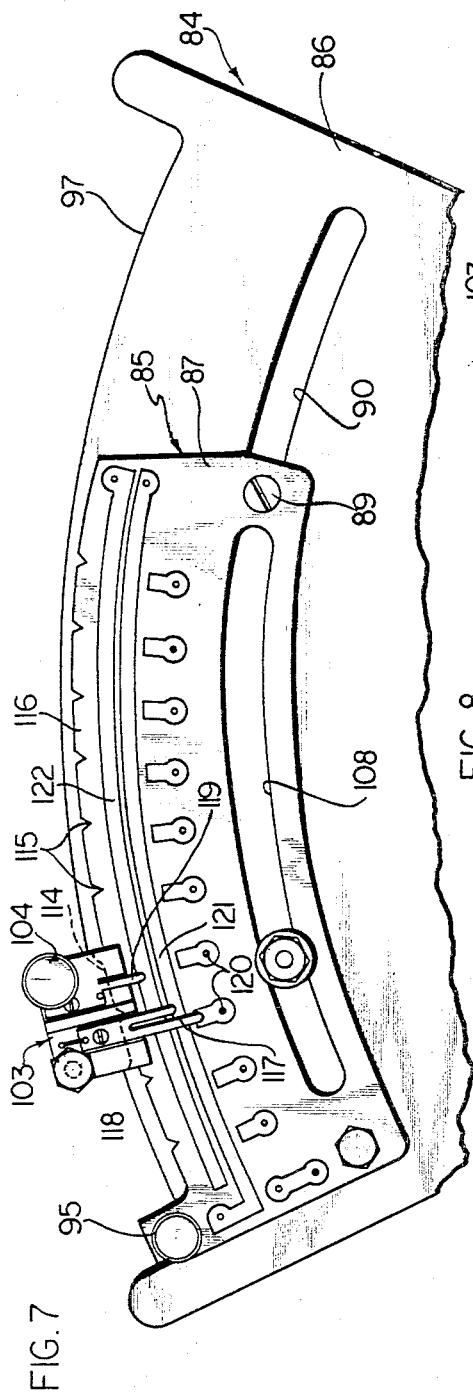

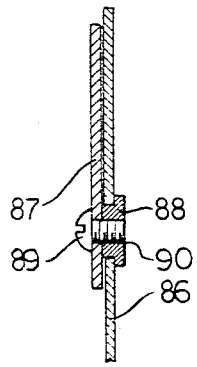
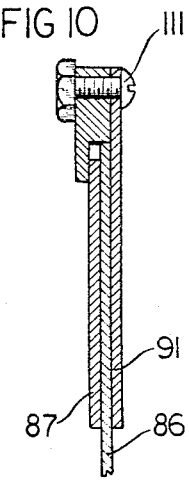
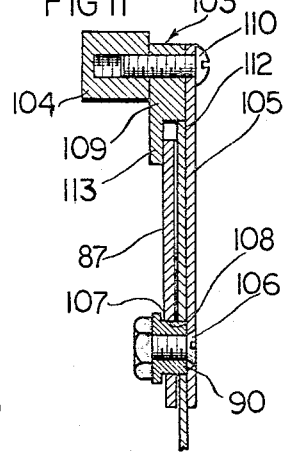
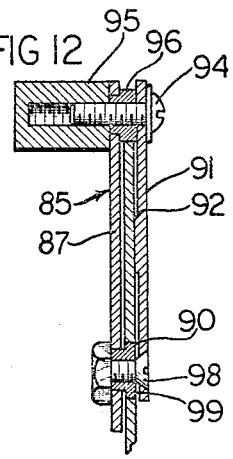
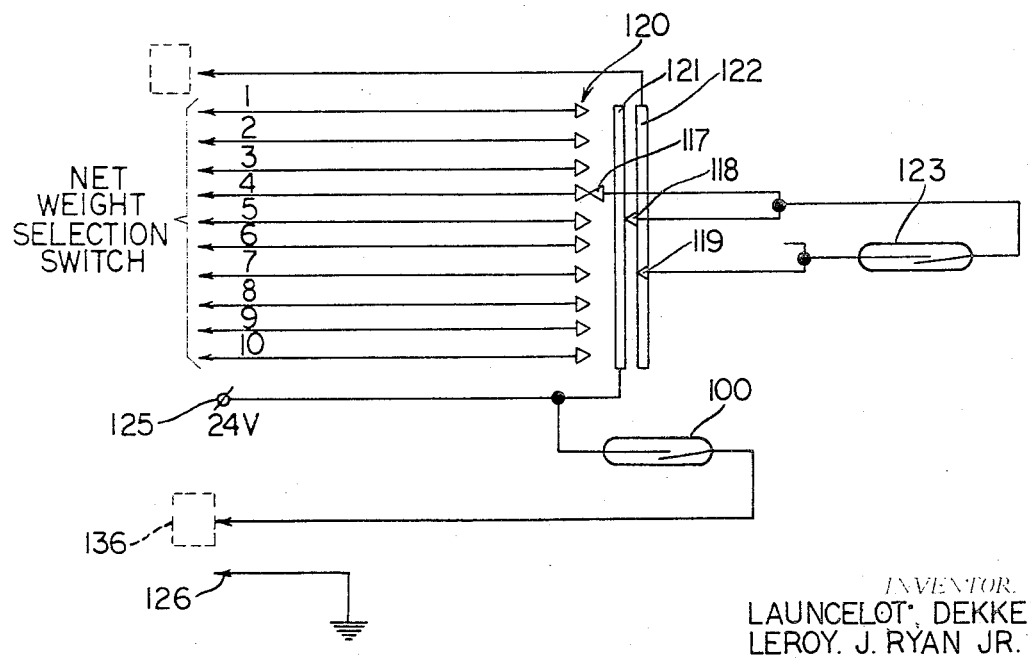

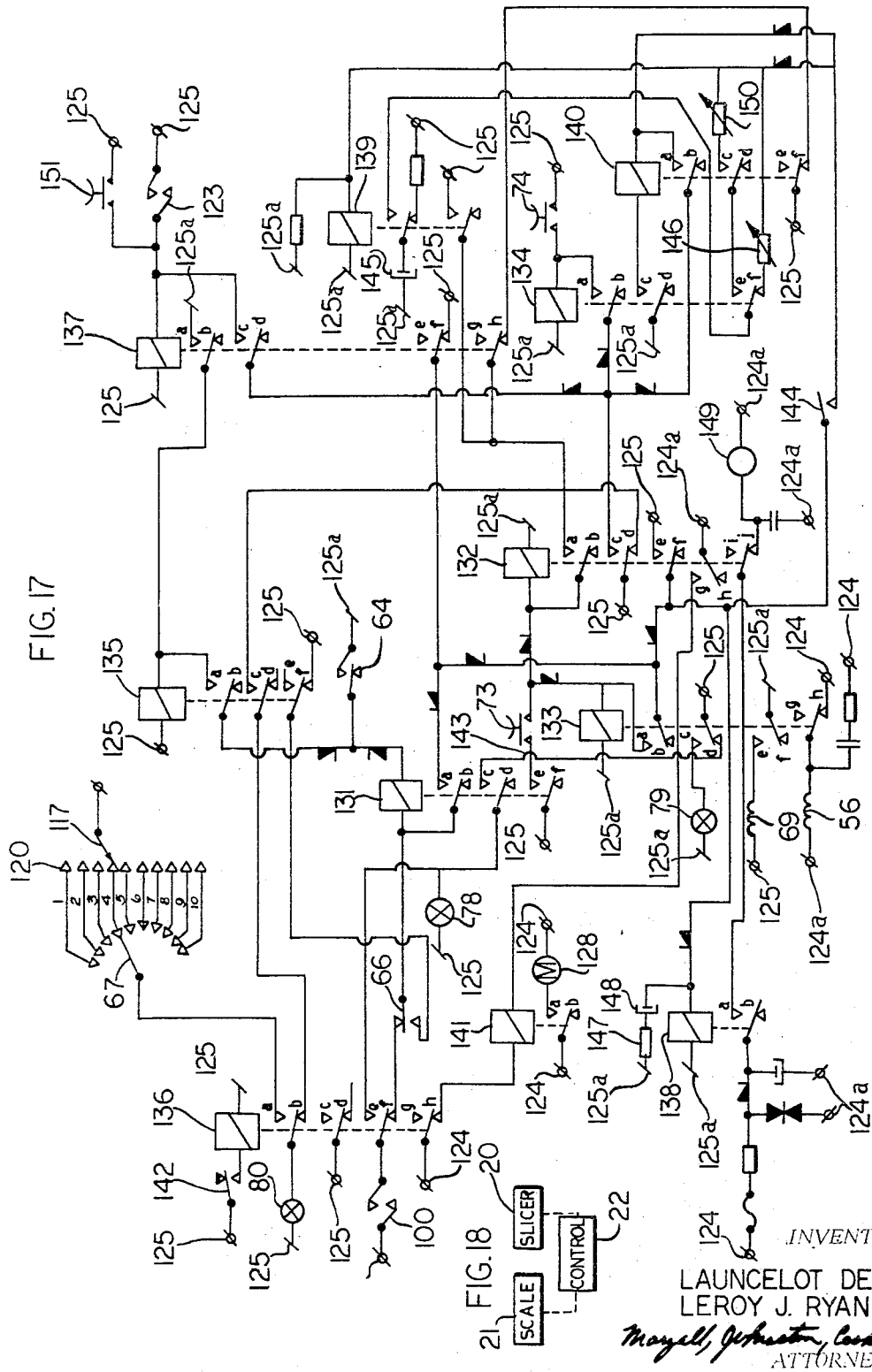

United States Patent Office 3,378,052
Patented Apr. 16, 1968

3,378,052
WEIGHT CONTROLLED SLICING MACHINE
Launcelot Dekker, La Porte, and Le Roy J. Ryan, Jr., Chicago, Ill., assignors to Maatschappij Van Berkel's Patent N.V., Leidschendam, Netherlands, a limited-liability company of the Netherlands
Filed Nov. 5, 1965, Ser. No. 506,546
9 Claims. (Cl. 146—102)

ABSTRACT OF THE DISCLOSURE

A weight controlled slicing machine including a food slicer, a weighing scale, and control means for controlling the operation of the slicer in response to the scale.

---

This invention relates in general to a weight controlled slicing machine, and more particularly to a weight controlled slicing machine that automatically slices a predetermined amount of food by weight, and still more particularly to a weight controlled slicing machine useful for making of sandwiches to maintain the same amount of sandwich filler in each successive sandwich, although other uses and purposes may be apparent to one skilled in the art.

The weight controlled slicing machine of the present invention includes generally a food slicer, a weighing scale, and control means for controlling the operation of the slicer in response to the scale. One example of use is in markets or stores selling sliced meats, cheese or other foods, wherein it is desired to provide a certain weight quantity of sliced food for packaging thereof or for serving a customer. A customer might desire a half a pound of sliced ham, and with the machine of the present invention, ham would be placed in the slicer, a control would be set for one-half pound, and the slicer would be started and which would thereafter slice one-half pound of ham and stop in response to the ham being weighed by the scale. Another example of use for the present invention involves the making of sandwiches where it would be desired to apply substantially the same amount of sliced food as a filler in each of any number of sandwiches, especially for quantity control.

The invention further is useful for concession stands at public events where a large number of sandwiches may be sold, and where accurate control of the sandwich filler is desired for each sandwich and accurate control and accounting of the sandwich filler can be accomplished without relying completely upon the honesty of the operators. Further, the machine is provided with such controls that tare weight of a bread slice can be accommodated, and so the sandwich filler can be applied directly to the bread slice while the filler is being weighed. Heretofore, great losses have been encountered in concession stands because of the operator's misjudgment as to the amount of sandwich filler to apply to each sandwich, and because of the ease with which sandwich filler could be illegally removed from the concession stand by operators.

It is therefore an object of the present invention to provide a weight controlled slicing machine.

Another object of this invention resides in providing a weight controlled slicing machine for automatically controlling the amount of food sliced by a slicer.

Still another object of this invention is in the provision of a weight controlled slicing machine that includes a scale, a slicer, and control means operable by the scale for regulating the on-off operation of the slicer.

A further object of this invention is to provide a weight controlled slicing machine capable of being initially set to slice a predetermined weight of food, and thereafter being operated to automatically slice that weight and stop.

A still further object of the present invention is in the provision of a weight controlled slicing machine that is especially useful for controlling the weight quantity of sliced food to be used in sandwiches.

Another object of this invention is to provide a weight controlled slicing machine especially useful for making sandwiches in concession stands, and to provide accurate inventory and control of the food supplied to the stand to be sliced and the amount of sliced food on each sandwich.

Still another object of the present invention is in the provision of a weight controlled slicing machine including a food slicer that discharges the sliced food onto a platform of a weighing scale, and electrical circuitry operable by the scale to control the operation of the slicer and stop same upon detecting a predetermined weight of food on the platform.

A still further object of this invention is to provide a weight controlled slicing machine capable of compensating for tare weight of a slice of bread and for thereafter controlling the amount of sliced food to be deposited on the slice of bread.

Another object of the present invention resides in the provision of a weight controlled slicing machine for making sandwiches that cannot be tampered with by the operator and which precludes the operator from varying the amount of sliced food by weight to be applied to each sandwich.

A still further object of this invention is in the provision of a weight controlled slicing machine that may be easily and inexpensively manufactured, is easy to control by the operator and to set by a supervisor, and is easy to disassemble for cleaning purposes.

Other objects, features and advantages of the invention will be apparent from the following detailed disclosure, taken in conjunction with the accompanying sheets of drawings, wherein like reference numerals refer to like parts, in which:

FIG. 3 is a longitudinal sectional view of the access door locking device with some parts in elevation for purposes of clarity;

FIG. 4 is a side elevational view taken substantially along line 4—4 of FIG. 3 and with some parts broken away to show underlying parts;

FIG. 5 is a vertical side elevational view, with some parts in section of the front cover or panel locking device of the machine of FIG. 1;

FIG. 6 is a detailed view taken substantially along line 6—6 of FIG. 5;

FIG. 7 is a fragmentary front elevational view of the scale digitizer assembly as removed from the scale for purposes of clarity;

FIG. 8 is a rear elevational view of the digitizer assembly of FIG. 7;

FIG. 9 is a transverse detail sectional view taken substantially along line 9—9 of FIG. 8;

FIG. 10 is a transverse detail sectional view taken substantially along line 10—10 of FIG. 8;

FIG. 11 is a transverse detail sectional view taken substantially along line 11—11 of FIG. 8;

FIG. 12 is a transverse detail sectional view taken substantially along line 12—12 of FIG. 8;

FIG. 13 is an electrical schematic view of the digitizer assembly of FIG. 7;

FIG. 17 is an electrical schematic view of the circuitry for the operation of the machine;

FIG. 18 is a block diagram illustrating broadly the interaction between the weighing scale, food slicer, and control means in accordance with the present invention.

Figure 1:
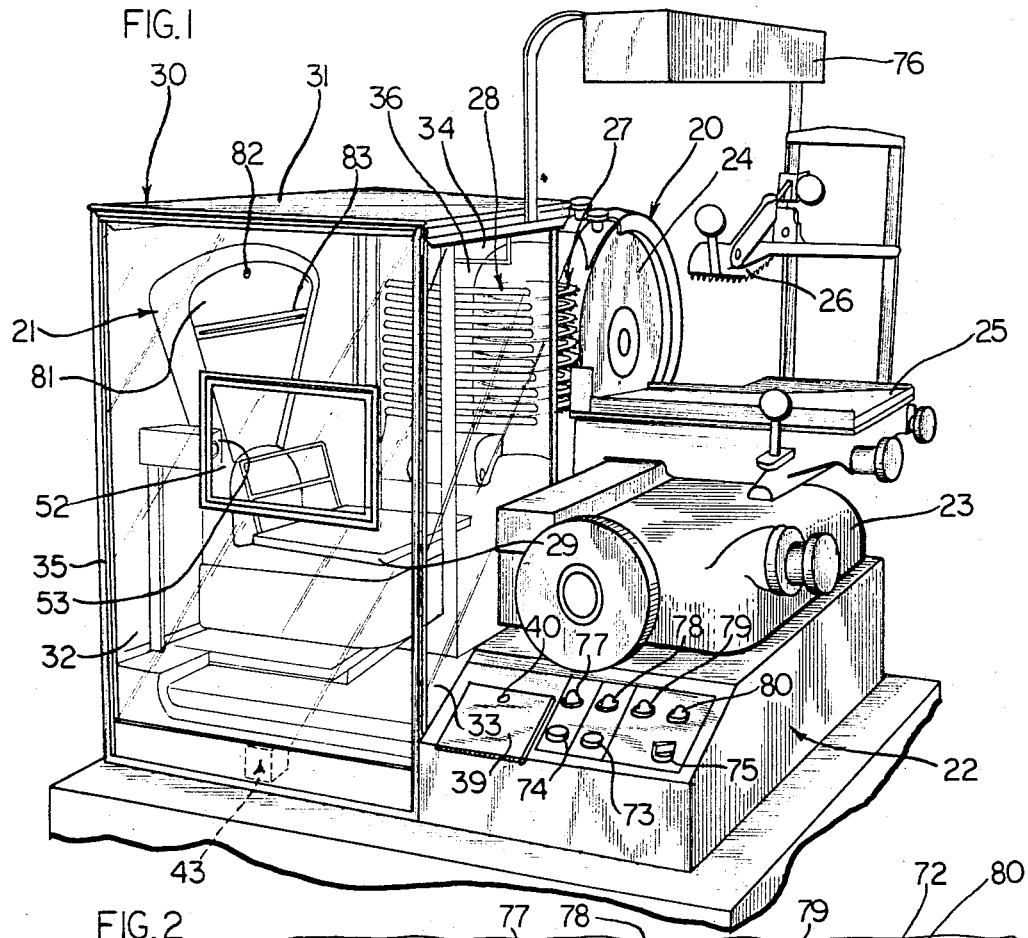
FIG. 1 is a perspective view of a weight controlled slicing machine for making sandwiches according to the invention.

Referring now to the drawings, the weight controlled slicing machine illustrated is an embodiment of the invention that is especially useful for making of sandwiches, and therefore especially useful at a concession stand or the like where a high number of sandwiches are made. However, it should be appreciated that the present invention is not limited to sandwich makers as it may also be employed wherever there is a need for accuracy in measuring a quantity of sliced food as it is sliced.

The sandwich maker illustrated in FIG. 1 includes generally a food slicer 20, a weighing scale 21, and control means 22 for controlling the operation of the food slicer 20 in response to actuation of the weighing scale 21. The block diagram of this arrangement is shown in FIG. 18.

The food slicer 20 is of a conventional type which generally includes a base 23 upon which is supported a rotary slicing knife 24 in a fixed position, and a reciprocating food carriage 25. The food carriage 25 reciprocates the food to be sliced back and forth across the slicing blade 24, and also feeds the food to be sliced toward the slicing knife in increments of desired slice thickness. A food holddown clamp 26 is provided on the carriage 25 to clamp the food to the carriage. As each slice of food is produced, it is impinged on a pinned carrier 27 which is mounted to rotate and convey the slice to a position in front of a discharge cage 28 that swings down, removing the slice from the pinned carrier 27 and depositing same onto the weighing platform 29 of the scale 21. Normally a slice of bread will have been positioned on the weighing platform 29, and the sliced food will be deposited on the bread slice.

The scale 21 is supported within an enclosure 30 that includes a metal top 31, Plexiglas side walls 32 and 33, a Plexiglas back wall 34, and a Plexiglas front cover or panel 35. The side wall 33 and the back wall 34 have an opening 36 therein to allow for bringing the food slice within the enclosure by the pinned carrier 27.

The front cover 35 and the side walls 32 and 33 and metal top 31 can be removed to permit cleaning of the scale and scale area. Further, the Plexiglas front cover and side and rear walls enables customers to view the slicing and weighing action of the machine when a sandwich is being made. The front cover is locked in place during normal operation of the machine, and in order to remove the front cover, it is necessary to unlock the cover by actuating the switch 37 that is located on the control panel 38. The control panel 38 is normally closed by a door 39 and locked into closed position by a lock 40 to prevent access thereto except by authorized personnel having a key for the lock. Thus, the operator cannot obtain removal of the front cover 35 to tamper with the scale 21. Operation of the switch 37 so that it is in the cover unlocked position energizes a solenoid 41 that is mounted on a plate 42 and forms a part of the front cover locking mechanism 43, FIGS. 5 and 6. The solenoid 41 includes a plunger 44 having a collar 45 serving to bottom one end of a spring 46, the other end of which is bottomed on the frame of the solenoid. Thus, the solenoid will be urged to the position shown in FIG. 5 by the spring 46 when it is deenergized. A locking pin 47 is connected to the plunger 44 and guidably received freely in a bore of the guide member 48. A catch 49 is attached to the lower end of the front cover 35 and freely received through a slot 50 in the plate 42, and further provided with an opening 51 that aligns with the end of the pin 47 when the front cover 35 is in locking position. Thus, actuation of the switch 37 causes energization of the solenoid 41 to withdraw the locking pin 47 from the catch 49 and permit swinging out of the front cover 35 so that it may be removed from the machine to permit complete access within the enclosure. The upper end of the front cover is received in a groove formed in the metal top 31, and therefore can be slid downwardly out of the groove when it is pivoted outwardly from the bottom away from the machine. Removal of the front cover 35 then allows the side walls 32 and 33 to be slid outwardly from their tracks that are arranged at their upper and lower ends and mounted at the frame of the enclosure and removal of the metal top 31 by lifting same from the frame of the enclosure. The front cover blocks removal of these side walls when it is in locked position as shown in FIG. 1. Thus with the front cover, side walls and top removed, complete access can be had to the weighing scale for servicing and/or cleaning thereof.

In order to obtain access to the scale platform 29 during normal operation of the machine, for placing the bread slices onto the platform and removing the slices with meat or sliced food thereon, a Plexiglas access door 52 is provided in the front cover 35. The access door 52 is hinged along its upper edge and swings inwardly. A locking device 53 is provided on the front cover to lock and unlock the access door during machine operation. While this will be more clearly hereinafter explained, the door is locked during the slicing operation so that the operator cannot obtain access to cause more or less meat to be discharged onto the platform.

The access door locking device 53 includes a horizontally extending casing 54 mounted on an upstanding support bar 55 along the inside of the front cover 35. A solenoid 56 having a plunger 57 is supported within the casing 54 and has a locking pin 58 pivotally connected to its outer end. The locking pin 58 is slidably guided in an opening formed in the top 59 of the casing 54 and includes a diametrically reduced portion 58a slidably guided in a guide bar 60 mounted within the casing. The plunger 57 and locking pin 58 are normally spring biased to the position shown in FIG. 4 by a spring 61 bottomed at one end against the guide bar 60 and at the other end against a shoulder 62 formed on the locking pin 58. A pin 63 extends through the locking pin 58 to limit the protracted movement of the locking pin, wherein the pin 63 hits against the guide bar 60a. Thus, the locking pin 58 is in locking position when the solenoid 56 is deenergized as shown in FIG. 4 to block inward swinging of the access door 52. Upon energization of the solenoid 56, the plunger 57 withdraws the locking pin 58 from the path of the access door 52 and allows the access door to be swung inwardly and open for placing bread slices or the like on the scale platform 29 or for removing bread and sliced food therefrom. A reed switch 64 is mounted within the casing 54 and actuatable by a magnet 65 carried on the access door 52 for detecting when the access door 52 is in closed position to be locked by the locking device 53 during the slicing operation. If the access door 52 is not closed, the reed switch 64 will be open and prevent any slicing operation.

Figure 2:
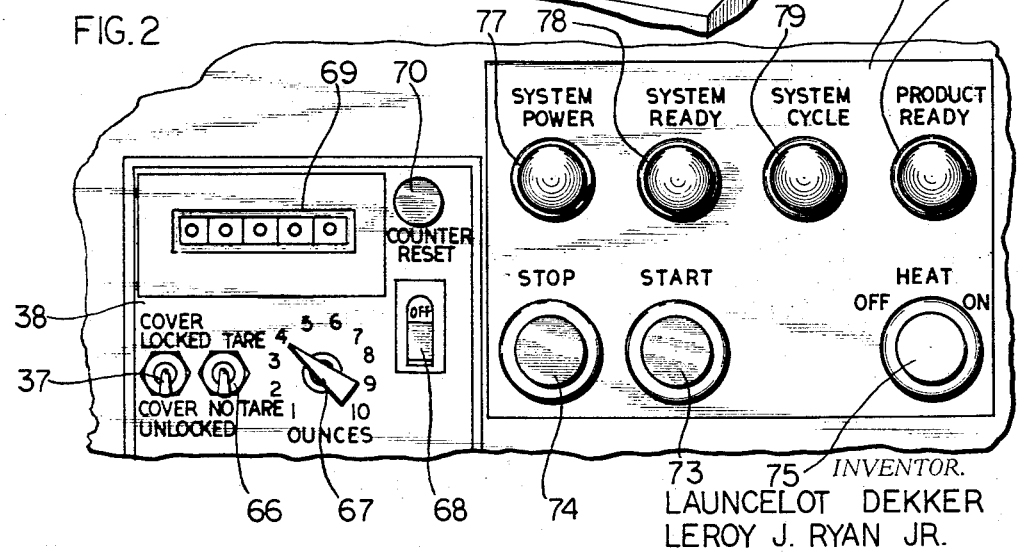
FIG. 2 is an enlarged fragmentary view of the control panel for the machine of FIG. 1.
Figure 16:
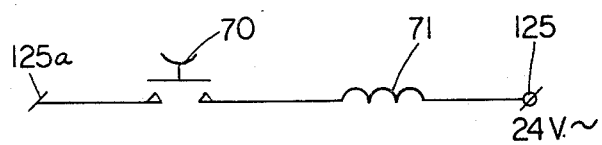
FIG. 16 is an electrical schematic view for the counter reset device.

Referring now to FIG. 2, the control panel 38 that is only accessible to the supervisor or one who has the key to unlock the door 39, in addition to having the front cover switch 37, includes a tare selection switch 66, a net weight selection switch 67, a main power switch 68, a counter 69, and a counterreset button 70. The tare selection switch 66 permits operation of the machine where tare is employed and where no tare would be employed. The net weight selection switch enables selecting the weight of the sliced product to be applied to the bread slice on the scale platter. The main power switch 68, also being a circuit breaker, serves to control the entire circuitry of the machine to line voltage. The counter 69 counts the number of weighings, and only operates when a gross weight has been reached. The counter may be reset to zero by pressing of the push button 70 that actuates a reset coil 71 (FIG. 16) for resetting of the counter.

A second control panel 72, always accessible to the operator and for indicating operation of the machine, is arranged next to the control panel 38. This control panel includes a start button 73 to start operation of the machine through a cycle, a stop button 74 to stop operation of the machine in case of emergency, a food warmer switch 74 for controlling operation of a heat lamp 76 that is supported above the food on the slicer carriage 25, a system power indicator light 77 to indicate that power is "ON" to the machine after switching on the power switch 68, a system ready indication lamp 78 to indicate during operation that all requirements to start slicing are fulfilled and during weight adjustments that the proper setting of the tare weight has been made, a system cycle indicating lamp 79 to indicate when the machine is operating and in the process of slicing and weighing and also to indicate that the cycle has not been completed if the stop button 74 has been depressed, and a product ready indicating lamp 80 to indicate when a weighing cycle has been completed and to the operator that the sliced product can be removed from the scale platter 29 and during weight range adjustments that the proper setting of the net weight has been made.

The supervisor or one who has the keys to the control panel door 39 must set up the machine prior to operation relative to tare and gross weight operations. The product to be sliced is placed on the carriage 25 of the slicer and appropriate adjustments may be made as to thickness of the slice. After opening the door 39 to the control panel 38, with the power switch 68 in the "ON" position, the operator can operate the front cover lock switch 37 to unlock the front cover and remove it to provide access to the weighing scale 21. A second locked door 81 is provided on the scale head, and locked in place by a suitable lock 82. After unlocking the door 81, it may be swung open and downwardly along a hinge 83 to provide access to a digitizer assembly 84, shown in FIGS. 7–12 and schematically in FIG. 13. Tare and gross weights are established and set by the digitizer assembly prior to operation of the machine.

The digitizer assembly 84 includes a tare plate commutator 85 adjustable along a support plate 86. The tare plate commutator 85 is arcuate in form, and includes a front plate 87 that is slidably and adjustably secured to the support plate 86 by a flanged collar 88 secured by a fastener 89 to the plate 87 and slidably received in an elongated arcuate slot 90 formed in the support plate 86, and a detent plate 91. The detent plate 91 is arranged on the back side of the support plate 86 and is provided with a detent 92 for engaging along a roughened or ratcheted section 93 on the back side of the plate 86. The detent plate 91 is secured at its upper end to the front plate 87 by means of a bolt 94 extending therethrough and threadedly engaged in a knob 95 that will be hereinafter referred to as the tare preset knob. A collar or roller 96 is arranged between the front plate 86 and the detent 91 and which rides along the upper arcuate edge 97 of the front plate 86. The detent plate 91 is fastened to the front plate 87 at its lower end by means of a bolt and nut arrangement 98 which also supports a roller or collar 99 slidably received in the slot 90. Thus by grasping the tare preset knob 95, the tare commutator plate 85 may be adjusted along the arcuate slot 90. While it can be appreciated that the tare adjustment may be for any desired weights, the machine illustrated allows for a five ounce range.

A tare weight reed switch 100 is mounted on the back side of the detent plate 91, and is actuated to close position when the indicator arm 101 is in alignment therewith, wherein the indicator arm is provided with a suitable magnet for operating the reed switch. It will be understood that the indicator arm 101 is interconnected with the weighing mechanism of the scale and therefore responsive to weight applied to the scale platter 29. The position of the indicator arm 101 and the tare commutator plate 85 in FIGS. 7 and 8 is at zero weight for the scale platter, where there would be no tare involved. For illustration purposes, a graduated scale in ounces is indicated by the numeral 102 as it is arranged on the back side of the support plate 86. Thus, if the tare weight were one ounce and the tare commutator plate 85 adjusted accordingly, the tare weight read switch 100 would not be actuated until the tare of one ounce was placed on the scale platter. After the setting of tare, the gross weight of the product desired is also set by adjustment of the wiper assembly 103 along the tare commutator plate 85. Adjustment is made by grasping of the gross weight preset knob 104. The wiper assembly 103 includes a rear plate 105 arranged along the back side of the support plate 86 and mounted to the support plate and front plate 87 of the commutator 85 at the lower end by a nut and bolt assembly 106 together with a roller 107 that is arranged in the support plate slot 90 and an arcuate slot 108 formed in the front plate 87. The plate 105 is provided at its upper end with a guide plate 109 which is secured thereto by means of a bolt 110 that engages in a threaded bore of the knob 104, and a nut and bolt assembly 111. The guide plate 109 is provided with a shoulder 112 that rides along the upper edge 97 of the support plate 86, and a flange 113 that extends over the front face of the front plate 87. A locating detent spring 114 is carried by the wiper assembly to engage in spaced notches 115 arranged along the upper edge 116 of the front plate 87 to assist in properly locating and temporarily locking the wiper assembly along the tare commutator plate 85. Thus, grasping of the gross weight preset knob 104 and moving it along the commutator plate 85 enables adjustment of the wiper assembly for determining the net weight of product to be sliced during each cycle of the machine.

Mounted on the guide plate 109 of the wiper assembly 103 are wiper contacts 117, 118 and 119 for respectively engaging spaced contacts 120, a continuous conductor contact 121 and a continuous conductor contact 122. As seen in the schematic diagram of FIG. 13, the wiper contacts 117 and 118 are interconnected and connected at one end to a gross weight reed switch 123 that is mounted on the back side of the plate 105 of the wiper assembly 103. The other end of the gross weight reed switch 123 is connected to the wiper contact 119 that wipes along the conductor 122. When the indicator arm 101 aligns with the gross weight reed switch 123, it will be actuated to closed position to indicate that the desired amount of product has been sliced and discharged onto the scale platter 29. While it can be appreciated that any range of weight may be handled by the scale and the digitizer assembly, the illustrated embodiment is particularly adapted to handle a total net weight up to ten ounces.

Referring now to the electrical schematic diagrams, FIGS. 14–17, all lines having 117 volts alternating current are indicated by the numeral 124, while all lines having the potential of zero volt alternating current are designated by the numeral 124a. Similarly, all lines having the positive potential of 24 volts D.C. are designated by the numeral 125, while all lines having the opposite minus voltage or the negative side of this potential are indicated by the numeral 125a. A ground wire network 126 is provided for the scale and slicer, together with the control means 22.

Figure 14:
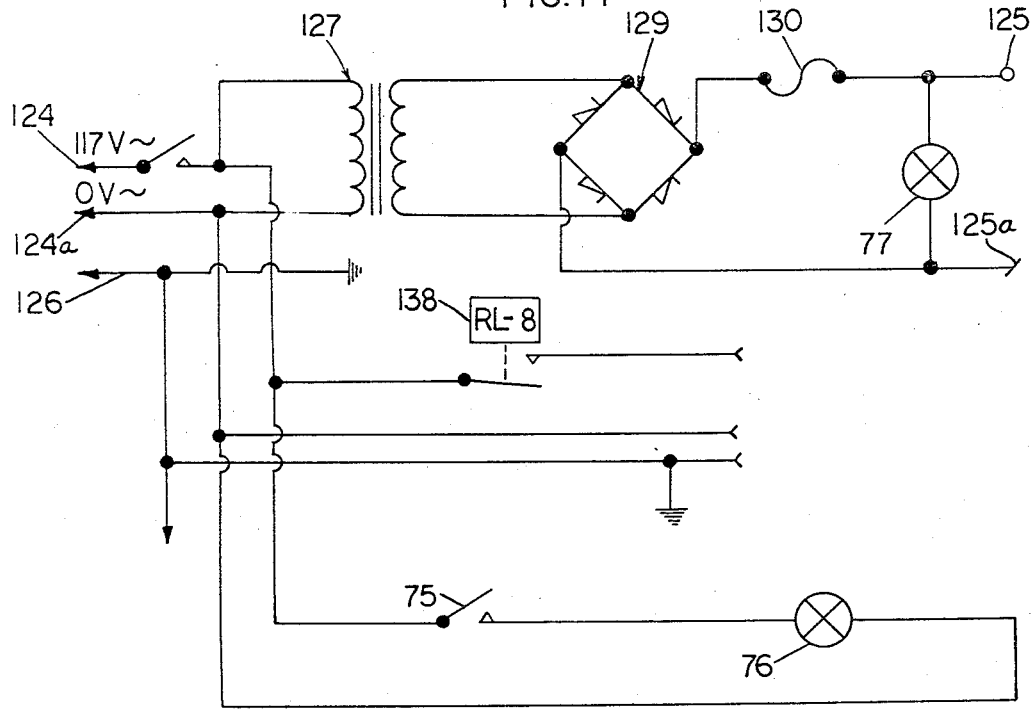
FIG. 14 is an electrical schematic view of the power supply of the present invention.
Figure 15:
FIG. 15 is an electrical schematic view for the front cover or panel locking device.

The power supply is shown in FIG. 14, wherein 117 volts A.C. is supplied to a step-down transformer 127, the slicer motor 128 and the heat lamp 76. The output from the step-down transformer 127 is delivered to a rectifier 129, the output of which produces the 24 volt potential. The 24 volt direct current potential is fused at 130.

Referring now to FIG. 17, all of the relays are shown in deenergized position, and the operating circuitry includes relays 131, 132, 133, 134, 135, 136, 137, 138, 139, 140 and 141.

Before operation of the machine, tare weight selection, if such be desired, and gross weight selection must be made, and as previously explained, these can be only made by the supervisor since controls for these selections are located behind locked doors. When the locked door 39 is unlocked and opened, a switch 142 is closed thus energizing relay 136. Energization of the relay 136 disconnects the power to all important components and connects the controls of the adjusting circuits.

The tare weight is preset by placing the required tare on the scale platter 29 which actuates the indicator arm 101 to the position commensurate with the tare weight. Then the tare weight reed switch 100 is located along the support plate 86 (FIGS. 7 and 8) by grasping of the tare preset knob 95 until the reed switch closes due to the alignment of same with the magnetic field of the indicator arm 101 and which then supplies power to the system ready indicator light 78 through contact 136e of the relay 136. The gross weight is then preset by first turning the net tare selection switch 67 to the desired net weight, for example four ounces as is indicated in FIGS. 7 and 17, after which the gross weight preset knob 104 is grasped to slide the wiper assembly 103 having the gross weight reed switch 123 mounted thereon until the wiper 117 coincides with the position of switch 67 as is shown in FIG. 17. Such provides power to the product ready indicator lamp, thus the wiper assembly 103 is moved until the product ready lamp 80 is energized. The system is then ready for operation after which the door 81 is locked into position, the front cover panel 35 is replaced and the door 39 is locked into position. It should be further assumed that the power switch 68 would be in the on position and that the tare selection switch 66 would be in the tare position as shown in FIG. 17. Closing and locking of the door 39 again opens the switch 142 to deenergize the relay 136.

While the above adjustments were explained relative to using the machine with tare, when no tare is used, the tare selection switch 66 must be in the no tare position, and the tare commutator plate 85 will also be located as far to the left on the support plate 86 as possible as shown in FIGS. 7 and 8, in which position no tare is sensed on the scale platter 29. Further, the relay 136 must be deenergized, which means the door 39 must be in locked position to open the switch 142, and the reed switch 64 must be closed, which means the access door 52 must be in closed position.

When operating the machine with tare and as adjusted according to the above description, the tare weight reed switch 100 must be closed, which means that the proper amount of tare weight is placed upon the platter 29, the relay 136 must be deenergized by closing and locking of the control panel door 39 and opening of switch 142, the tare selection switch 66 must be in the tare position, and the access door reed switch 64 must be closed which is accomplished by closing of the access door 52. With these conditions met, the relay 131 will energize and self-hold through contacts 131a and 137f. Relay 137 will be in deenergized position. The system ready indicator light 78 will energize through contacts 131c and 133d, where relay 133 is in deenergized position. Further, the startline 143 is connected to the start switch 73 so that the system may now be started by depressing of the start switch.

Upon depressing of the start button 73, relays 132 and 133 energize simultaneously, thereby lighting up the system cycle indicator light 79 through contact 133c. Relay 132 self-holds through contacts 132a, 137h and 140f, where relays 137 and 140 are deenergized. Relay 132 also energizes relay 141 through contact 132g to start the slicer motor 128 through the contact 141a, and relay 138 through contact 132e. Relay 133 self-holds through contacts 133a and 137f with the relay 137 deenergized. While relay 133 energizes the system cycle indicator lamp 79, it also deenergizes the system ready indicator light 78 through contact 133d. Relay 133 also disconnects the power line to the solenoid 56 of the access door 52 so that this solenoid locks the access door in closed position, and further connects the power to the counter coil 69 so that it will advance a half count, the count being completed when the power is disconnected again. During the slicing weighing cycle, when the system cycle indicator lamp 79 is lit, relay 139 will energize and deenergize continually every time the carriage 25 of the slicer 20 completes a stroke by closing and opening of the stroke limit switch 144, but this will not have any effect on the slicing weighing cycle.

The gross weight reed switch 123 will close as soon as the gross weight is reached as the indicator arm 101 aligns with the reed switch, and this will energize relay 137 which will self-hold through contact 137c and contact 132c with relay 132 energized. Relay 137 also energizes relay 135 through contact 137a which self-holds through contact 135a and the closed reed switch 64. Relay 137 also disconnects the power to relay 131 by opening contact 137f, and relay 131 then disconnects the startline 143 to prevent accidental starting of the machine when the sliced product is still lying on the scale platter. Further, relay 137 disconnects the power to relay 132 by opening contact 137h, but relay 132 will not deenergize until relay 139 is deenergized. Relay 139 is energized by the closing of the stroke limit switch 144, but delayed in deenergizing by the capacitor 145 and the variable resistor 146. Thus, the capacitor 145 must unload through the resistor 146 to permit deenergization of relay 139. As soon as relay 139 is deenergized, it will in turn deenergize relay 132 through contact 139d, and relay 132 will in turn deenergize relays 133 and 141, respectively, through opening of contacts 132e and 132g, thereby disconnecting the power to the slicer motor 128, the counter coil 69, the system cycle indicator lamp 79, and apply power to the access door solenoid 56 to unlock the access door 52 and permit entry into the scale area. Further, deenergizing the relay 132 disconnects the power to relay 138 by opening contact 132e, but the resistor 147 and capacitor 148 in parallel with the relay 138 delay deenergization for a period of time, preferably five seconds. With relay 132 deenergized and relay 138 energized, power is connected to the slicer brake 149 through the contacts 138a and 132j to thereby apply dynamic braking to the slicer motor. Deenergization of relay 132 also connects power to the product ready indication lamp 80 through contacts 132d and 135c of energized relay 135.

Upon opening of the access door 52, the reed switch 64 will open and drop out relay 135 which in turn deenergizes the product ready indication lamp 80. When the sliced product is removed from the scale platter 29, the indicator arm 101 of the scale returns to zero weight and the machine is ready for a successive cycle. Other necessary resistors, capacitors and diodes are provided to assure proper operation of the electrical circuitry.

Assuming that the machine is in operation and in the cycling condition, depressing of the stop buton 74 energizes relay 134, which self-holds through relay contacts 134a and 132c (relay 132 being energized). Upon closing of the stroke limit switch 144, such will then energize relay 140 which self-holds through contacts 140a and 132c. With relay 140 energized, it will disconnect power to relay 132 by opening contact 140f, but relay 132 will remain energized until the deenergization of relay 139. Relay 139 will not deenergize until the capacitor 145 has unloaded itself through resistor variable 150. As soon as relay 139 deenergizes, it will deenergize relay 132 which in turn deenergizes relays 134, 140 and 141 thus disconnecting the power to the slicing motor 128. Relay 133 will remain energized through relay 137 in "off" position. Deenergization of relay 132 also disconnects the power to relay 128, but this relay will remain energized for another five seconds due to the resistor 147 and capacitor 148 network. With relay 132 deenergized and relay 138 energized, the slicer brake 149 is energized until relay 138 falls out after the five second delay. At the end of this stopping sequence, only relays 131 and 133 are energized, and thus the system cycle indicator lamp 79 is still energized.

Thereafter, the machine may again be started by depressing of the start button 73 which energizes relay 132 which self-holds through deenergized relays 137 and 140. Relay 132 in turn energizes relays 138 and 141. It should be appreciated that relay 138 does not at this time energize the slicer brake 149 since this requires relay 138 "on" and relay 132 "off." But relay 141 applies power to the slicing machine so that it will start slicing. The machine continues to run until the gross weight is reached and the gross weight reed switch 123 is closed.

A rear position push button 151 is provided to assist the serviceman in adjusting the rear stop position of the slicer carriage. This switch bypasses the gross weight reed switch 123, and thus, the serviceman does not have to wait until the gross weight has been reached before adjusting the rear stop position. In this connection, the stroke limit switch 144 closes momentarily every time the carriage of the slicer makes one complete stroke, and in this way determines the exact location of the carriage at that particular time and further serves as a reference for determining the stopping places of the carriage.

Figure 19:
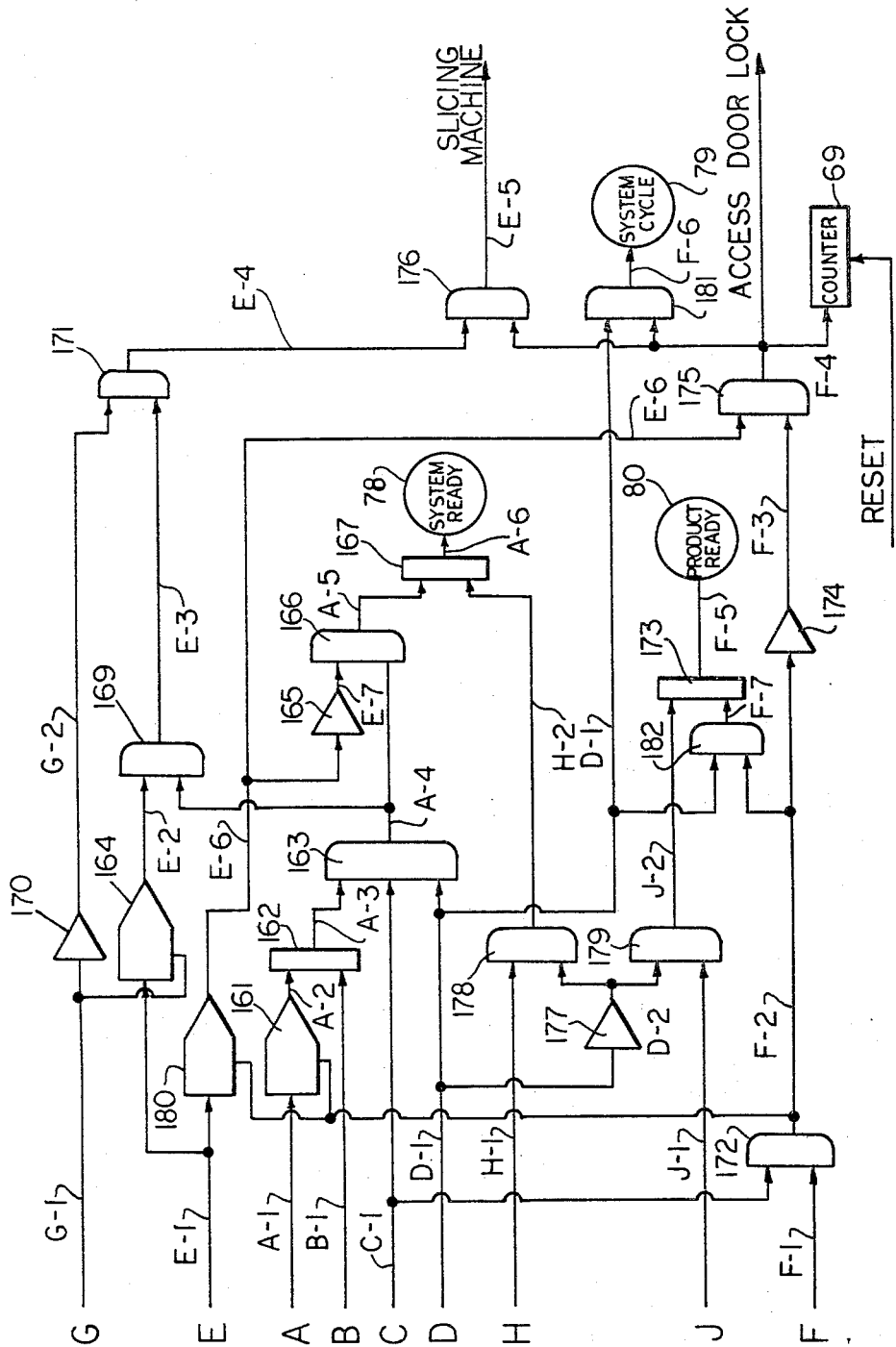
FIG. 19 is a logic block diagram for the operation of the machine.

In order to more clearly understand the operation of the present invention, reference is made to the logic block diagram of the machine, FIG. 19. Before it is possible to initiate operation of the machine by depressing the start button 73 to effect a slicing-weighing operation, electrical signals must be present at A or B, and C, D and E, while the electrical signals must be absent from F and G. In order to lock the access door 52, the presence of the same signals must be available, while only signal F must be absent. Thus, any other combination of signals will not enable starting of the machine and the slicing-weighing cycle, or locking of the access door 52. Further, when signals G or F is given, the machine will stop. The lock 53 of the access door 52 will unlock only if signal F is present. And signals H and J are used only during the adjusting of tare and net weights.

When the correct tare weight is placed upon the scale platter 29, signal A will proceed through line A–1 to the memory 161, where it will be retained and further presented to line A–2, and until a signal is presented at line F–2. When no tare is to be employed, a signal will be present at B. Thus, when a signal is presented by the memory 161 or a signal is present at B, either signal will travel respectively along line A–2 or B–1 to the OR gate 162, which in turn presents a signal to line A–3. Thus, a signal through either line A–2 or B–1 to the OR gate 161 causes a signal to be presented to line A–3. When the access door 52 is closed, the magnetic reed switch 64 presents a signal to C. A signal is presented to D when the control panel door 39 is locked. Thus, with signals presented on lines A–3, C–1 and D–1, the AND gate 163 will present a signal to line A–4.

When there is an absence of a signal on line E–6, the inverter 165 presents a signal to line E–7, which signal together with a signal on line A–4 causes the AND gate 166 to present a signal to line A–5. The signal on line A–5 will be transferred by the OR gate 167 to line A–6 and the indicator light 78 to energize same and indicate that all conditions for starting the machine are fulfilled.

Depressing of the start button 33 presents a temporary signal to E that is transferred to memories 164 and 180 through line E–1, and then retained and in turn presented to lines E–2 and E–6, and until a signal is presented at line G–1 or F–2. The signal in line E–6 will reverse the inverter 165 to cancel the signal given along line E–7 to the AND gate 166, thereby causing the signal to be removed from line A–5, the OR gate 167, and the line A–6 to deenergize the indicator light 78. A signal on lines A–4 and E–2 causes the AND gate 169 to present a signal to line E–3. Since all conditions for starting the machine have been fulfilled, and no signal has been presented to F, the AND gate 172 will not give a signal to line F–2. Since there is no signal on line F–2, the inverter 174 will present a signal to line F–3. When signals are presented on lines E–6 and F–3, the AND gate 175 will transfer the signal to line F–4 causing the access door lock 53 to lock the access door 52 in locked position. Signals on lines D–1 and F–4 cause the AND gate 181 to present a signal to line F–6 and the indicator light 79 to energize the latter. Since the stop button 74 has not been depressed, no signal has been given to G, thereby allowing the inverter 170 to present a signal to line G–2, the latter of which along with a signal on line E–3 causes the AND gate 171 to present a signal to line E–4. Signals on lines E–4 and F–4 cause the AND gate 176 to present a signal to line E–5 for energizing the slicer 20 and initiating a slicing-weighing cycle that continues until the gross weight is reached.

When the gross weight is detected by the scale platter 29, a signal is presented to F and line F–1, which together with a signal on line C–1 causes the AND gate 212 to present a signal to line F–2. Signals on lines D–1 and F–2 cause the AND gate 182 to give a signal to line F–7 and the OR gate 173. The OR 173 presents a signal to line F–5 and the indicator light 80 to energize the latter. The signal on line F–2 causes the inverter 174 to remove the signal from lines F–3 and F–4 and thereby stops the machine at the completion of the slicing-weighing cycle, and further unlocking the access door 52 and deenergizing the indicator lamp 79. Further, the removal of the signal from line F–4 operates the counter 69 to add one count. A signal on line F–1, with the access door closed, thereby causing the AND gate 172 to present a signal along line F–2, erases the memories 161 and 180. Opening of access door 52, after the slicing-weighing cycle and when the gross weight has been reached, removes the signal from C and from lines C–1, F–2, F–7, and F–5, thereby deenergizing indicator lamp 80. After the sliced product has been removed from the platter 29, thereby removing the signal at F, and even though a signal is presented at C upon closing of the access door 52, no signal will be presented along F–2, and therefore the indicator lamp 80 will remain deenergized.

When the machine is to be stopped before the gross weight has been reached, depressing of the stop button 74 presents a signal at G to line G–1. While the signal to G is momentary, that signal on G–1 erases the memory 164, and removes the signal from line E–2, which in turn removes the signal from line E–3, even when the inverter 170 again impresses a signal on line G–2 upon release of the stop button 174. During depressing of the stop button 174, the inverter 170 removes the signal from line G–2 that likewise removes the signal from lines E–4 and E–5, thus stopping the machine. However, the access door 52 remains locked and the indicator light 79 remains lit. Thereafter, to restart the machine, a start button 73 must be depressed to apply a signal at E to line E–1 which will again be retained by memory 164 and advance to line E–2. A signal on lines E–2 and A–4 causes the AND gate 169 to present a signal on line E–3. And in the absence of a signal along the line G–1, the inverter 170 again impresses a signal along line G–2, which along with the signal along line E–3 is transferred by the AND gate 171 to line E–4. And a signal on lines E–4 and F–4 is transferred by the AND gate 176 to line E–5, thus restarting the cycle of the machine.

When tare or net weight have to be reset, the control panel door 39 is unlocked and opened, thereby removing the signal from line D–1 and D. Removal of the signal from line D–1 causes removal of signal from lines A–4, E–3, E–4, and E–5, thus preventing the machine from cycling if the start button 74 is accidentally depressed, or to stop cycling of the machine if it is cycling when the door is opened. Further, the indicator lamps 78, 79 and 80, if they were lit, would be deenergized by removal of signal from lines A–5, A–6, F–6, F–7 and F–5. Also removal of signal from line D–1 allows the inverter 177 to apply a signal to line D–2. When the proper tare weight is set, the magnetic reed switch 100 will present a signal at H and therefore to line H–1. Signals on lines H–1 and D–2 cause the AND gate 178 to transfer a signal to line H–2 and line A–6 through the OR gate 167 to energize the indicator lamp 78 and indicate that proper tare has been set.

Upon setting of proper net weight, the magnetic reed switch 123 will give a signal to J and thus to line J–1 which together with a signal along line D–2 causes the AND gate 219 to transfer a signal along line J–2 and F–5 through the OR gate 173 to energize the indicator lamp 80, and thereby indicate that the proper net weight is set.

Upon closing and locking of the control panel door 39, a signal at D will be presented to line D–1 and cause the inverter 177 to remove the signal from line D–2, and thereby remove signals from lines H–2 and J–2, and A–6 and F–5, and thereby deenergize indicator lamps 78 and 80, assuming that they were only lit by a signal from lines H–2 or J–2.

It will be understood that modifications and variations may be effected without departing from the scope of the novel concepts of the present invention, but it is understood that this application is to be limited only by the scope of the appended claims.

The invention is hereby claimed as follows:

1. A weight controlled slicing machine comprising, a weighing scale having a weighing platform, a food slicer for successively cutting slices from a food product and depositing same on said weighing platform, a control panel having a start button thereon for initiating a slicing-weighing cycle, a digitizer assembly on said scale for preselecting tare and gross weight for said cycle and signalling when tare and gross weight is reached, said digitizer assembly including a tare weight magnetic reed switch and a gross weight magnetic reed switch, both of which are responsive to the position of said platform, and electrical circuit means interconnecting said food slicer, start button and digitizer assembly for effecting interaction therebetween.

2. The combination as defined in claim 1, and interlocking means in said electrical circuit means preventing operation of said slicing-weighing cycle if tare weight is not detected by said scale.

3. The combination as defined in claim 1, and indication means on said control panel indicating when tare weight is established on said platform, the slicing-weighing cycle, and the completion of the slicing-weighing cycle.

4. A weight controlled slicing machine comprising, a weighing scale having a weighing platform, an enclosure about said weighing scale having an access door to permit access to said weighing platform, a food slicer for successively cutting slices from a food product and depositing same on said weighing platform, and means for operating said machine for a slicing-weighing cycle to deposit a predetermined weight of food product on said platform, said means including a locking mechanism for locking the access door in closed position during the slicing-weighing cycle.

5. A weight controlled slicing machine comprising, a weighing scale having a weighing platform, an enclosure about said weighing scale having an access door to permit access to said weighing platform, a food slicer for successively cutting slices from a food product and depositing same on said weighing platform, means for operating said machine for a slicing-weighing cycle to deposit a predetermined weight of food product on said platform, said means including a locking mechanism for locking the access door in closed position during the slicing-weighing cycle, said means further including a control panel having a start button thereon for initiating said slicing-weighing cycle, means on said scale for preselecting the weight of food product to be sliced and deposited on said platform and signalling when said weight is reached, said scale means including a magnetic reed switch, and electrical circuit means interconnecting said food slicer, start button and scale means for effecting interaction therebetween.

6. A weight controlled slicing machine comprising, a weighing scale having a weighing platform, an enclosure about said weighing scale having an access door to permit access to said weighing platform, a food slicer for successively cutting slices from a food product and depositing same on said weighing platform, means for operating said machine for a slicing-weighing cycle to deposit a predetermined weight of food product on said platform, said means including a control panel having a start button thereon for initiating said slicing-weighing cycle, a digitizer assembly on said scale having a presettable tare weight magnetic reed switch for preventing initiation of said slicing-weighing cycle until a preselected tare weight has been detected by the scale and a presettable gross weight magnetic reed switch for concluding the cycle when a preselected gross weight is detected by said scale, and electrical circuitry interconnecting said slicer, said start button and said digitizer assembly to effect interaction therebetween.

7. The combination as defined in claim 6, and means for registering the slicing-weighing cycles.

8. A weight controlled slicing machine comprising, a weighing scale having a weighing platform, an enclosure about said weighing scale having an access door to permit access to said weighing platform, a food slicer for successively cutting slices from a food product and depositing same on said weighing platform, means for operating said machine for a slicing-weighing cycle to deposit a predetermined weight of food product on said platform, said means including a control panel having a start button thereon for initiating said slicing-weighing cycle, a digitizer assembly on said scale having a presettable tare weight magnetic reed switch for preventing initiation of said slicing-weighing cycle until a preselected tare weight has been detected by the scale and a presettable gross weight magnetic reed switch for concluding the cycle when a preselected gross weight is detected by said scale, a locking mechanism for locking the access door in closed position during the slicing-weighing cycle, and electrical circuitry interconnecting said slicer, said start button, said digitizer assembly, and said locking mechanism to effect interaction therebetween.

9. A weight controlled slicing machine comprising, a weighing scale having a weighing platform, an enclosure about said weighing scale having an access door to permit access to said weighing platform, a food slicer for successively cutting slices from a food product and depositing same on said weighing platform, means for operating said machine for a slicing-weighing cycle to deposit a predetermined weight of food product on said platform, said means including a control panel having a start button thereon for initiating said slicing-weighing cycle, a digitizer assembly on said scale having a presettable tare weight magnetic reed switch for preventing initiation of said slicing-weighing cycle until a preselected tare weight has been detected by the scale and a presettable gross weight magnetic reed switch for concluding the cycle when a preselected gross weight is detected by said scale, a locking mechanism for locking the access door in closed position during the slicing-weighing cycle, and indication lights on said control panel to indicate when the preset tare weight is established, the slicing-weighing cycle and when the cycle has been completed, and electrical circuitry interconnecting said slicer, said start button, said digitizer assembly, said locking mechanism and said indication lights to effect interaction therebetween.

References Cited

UNITED STATES PATENTS

| | | | |
|---|---|---|---|
| 1,409,872 | 3/1922 | Long | 177—124 X |
| 2,165,047 | 7/1939 | Gauldoni. | |
| 2,258,081 | 10/1941 | Weckerly. | |
| 2,691,997 | 10/1954 | Matarrese | 146—102 X |
| 3,204,676 | 9/1965 | Gillman | 146—94 |
| 3,220,498 | 11/1965 | De Paro et al. | 146—94 X |

JAMES M. MEISTER, *Primary Examiner.*